United States Patent
Park et al.

(10) Patent No.: US 10,195,961 B2
(45) Date of Patent: Feb. 5, 2019

(54) APPARATUS AND METHOD FOR CONTROLLING ENGINE OF HYBRID VEHICLE

(71) Applicants: HYUNDAI MOTOR COMPANY, Seoul (KR); KIA MOTORS CORPORATION, Seoul (KR)

(72) Inventors: Jung Soo Park, Seoul (KR); Myung Seok Lee, Hwaseong-si (KR); Hong Kee Sim, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 15/653,980

(22) Filed: Jul. 19, 2017

(65) Prior Publication Data

US 2018/0162235 A1  Jun. 14, 2018

(30) Foreign Application Priority Data

Dec. 12, 2016  (KR) .......................... 10-2016-0168778

(51) Int. Cl.
  *B60W 20/00* (2016.01)
  *B60L 15/36* (2006.01)
  (Continued)

(52) U.S. Cl.
  CPC .............. *B60L 15/36* (2013.01); *B60H 1/004* (2013.01); *B60H 1/00771* (2013.01);
  (Continued)

(58) Field of Classification Search
  CPC .......................... B60W 20/00; B60W 30/1886
  See application file for complete search history.

(56) References Cited

U.S. PATENT DOCUMENTS 5,544,493 A * 8/1996 Suzuki ................... B60H 1/321
  62/133
7,454,922 B2 * 11/2008 Zeigler .............. B60H 1/00378
  123/41.19

(Continued)

FOREIGN PATENT DOCUMENTS

JP          2013-237305 A    11/2013
KR        10-1592712 B1     2/2016
KR     10-2016-0035993 A    4/2016

*Primary Examiner* — James A Shriver, II
*Assistant Examiner* — James J Triggs
(74) *Attorney, Agent, or Firm* — Brinks Gilson & Lione (57) ABSTRACT

The present disclosure provides an apparatus and a method for controlling an engine of a hybrid vehicle. The apparatus includes an environment information collection unit configured to collect traveling environment information of the hybrid vehicle, a determination unit configured to compare the traveling environment information with reference information and determine whether the traveling environment information meets a preset condition, a setting unit configured to set a reference coolant temperature based on the traveling environment information and change the reference coolant temperature based on the traveling environment information when the traveling environment information meets the preset condition, and an engine control unit configured to prevent the engine from operating heating and air-conditioning control of the hybrid vehicle when the traveling environment information meets the preset condition and a coolant temperature is lower than the reference coolant temperature changed by the setting unit.

20 Claims, 6 Drawing Sheets

(51) Int. Cl.
  *B60H 1/00* (2006.01)
  *B60L 11/18* (2006.01)
  *B60W 10/06* (2006.01)
  *B60W 10/26* (2006.01)
  *B60W 40/02* (2006.01)
  *B60L 1/00* (2006.01)
  *B60L 1/02* (2006.01)
  *B60L 11/02* (2006.01)
  *B60W 50/08* (2012.01)
  *B60K 6/442* (2007.10)

(52) U.S. Cl.
  CPC .......... *B60H 1/00807* (2013.01); *B60L 1/003* (2013.01); *B60L 1/02* (2013.01); *B60L 11/02* (2013.01); *B60L 11/18* (2013.01); *B60L 11/1862* (2013.01); *B60W 10/06* (2013.01); *B60W 10/26* (2013.01); *B60W 40/02* (2013.01); *B60K 6/442* (2013.01); *B60L 2240/34* (2013.01); *B60L 2240/662* (2013.01); *B60W 50/087* (2013.01)

(56) References Cited

U.S. PATENT DOCUMENTS

| | | | | |
|---|---|---|---|---|
| 2002/0113576 | A1* | 8/2002 | Oomura | B60H 1/004 320/134 |
| 2004/0144107 | A1* | 7/2004 | Breton | B60H 1/00778 62/129 |
| 2014/0144998 | A1* | 5/2014 | Ichishi | B60H 1/00314 237/12.3 A |
| 2015/0298522 | A1* | 10/2015 | Hirabayashi | F02D 41/068 701/36 |
| 2018/0162235 | A1* | 6/2018 | Park | B60H 1/00807 |

\* cited by examiner

FIG.1

| | | |
|---|---|---|
| 211 — | HEATING  SET ON | |
| 212 — | FATC ENG  OFF | |
| 213 — | OUTSIDE TEMPERATURE  <  REFERENCE OUTSIDE TEMPERATURE | FATC ENG ON PREVENTION |
| 214 — | SOC  <  REFERENCE SOC | |
| 215 — | COOLANT TEMPERATURE  <  REFERENCE COOLANT TEMPERATURE | |
| 216 — | TRAVELING MODE  :  URBAN MODE | |

APPARATUS AND METHOD FOR CONTROLLING ENGINE OF HYBRID VEHICLE

CROSS-REFERENCE TO RELATED APPLICATION

The present application claims priority to and the benefit of Korean Patent Application No. 10-2016-0168778, filed on Dec. 12, 2016, which is incorporated herein by reference in its entirety.

FIELD

The present disclosure relates to an apparatus and a method for controlling an engine of a hybrid vehicle.

BACKGROUND

The statements in this section merely provide background information related to the present disclosure and may not constitute prior art.

In general, a hybrid vehicle controls an on/off operation of an engine based on an operating state such as a vehicle driving condition, a high-voltage battery charge/discharge state, a cooling state, a vehicle check state, and an air conditioning state by heating control. In the case of a hybrid vehicle, cooling control or heating control is performed for air conditioning. The heating control is a scheme of controlling the air conditioning by using the driving heat of the engine as an energy source. When the air condition gets worse, the hybrid vehicle controls the on/off operations of the engine based on a preset air conditioning condition without regard to the battery state or the driving condition of the hybrid vehicle.

However, since the engine operation by the air conditioning condition during the heating control is performed separately from the engine efficiency, the number of times the engine is turned on and off increases as well as an amount of the non-driven fuel consumption for heating control in a cold weather.

SUMMARY

The present disclosure provides an apparatus and a method for controlling an engine of a hybrid vehicle, which can restrict the on/off operation of the engine when the heating air-conditioning control is performed, thereby reducing the amount of the non-driven fuel consumption.

In some forms of the present disclosure, an apparatus for controlling an engine of a hybrid vehicle includes: an environment information collection unit that collects traveling environment information of the hybrid vehicle, a determination unit configured to compare the traveling environment information with reference information and to determine whether the traveling environment information meets a preset condition; a setting unit configured to set a reference coolant temperature based on the traveling environment information, and when the traveling environment information meets the preset condition, to change the reference coolant temperature based on the traveling environment information; and an engine control unit configured to, when the traveling environment information meets the preset condition and a coolant temperature is lower than the reference coolant temperature changed by the setting unit, prevent the engine from operating heating air-conditioning control of the hybrid vehicle In other forms of the present disclosure, a method of controlling an engine of a hybrid vehicle includes: collecting traveling environment information of the hybrid vehicle; comparing the traveling environment information with reference information and determining whether the traveling environment information meets a preset condition; setting a reference coolant temperature based on the traveling environment information; changing the reference coolant temperature based on the traveling environment information when the traveling environment information meets the preset condition, and preventing the engine from operating heating and air conditioning control of the hybrid vehicle, when the traveling environment information meets the preset condition and a coolant temperature is lower than the reference coolant temperature changed based on the traveling environment information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 2 to 3B are views illustrating an operation of an apparatus for controlling an engine of a hybrid vehicle;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
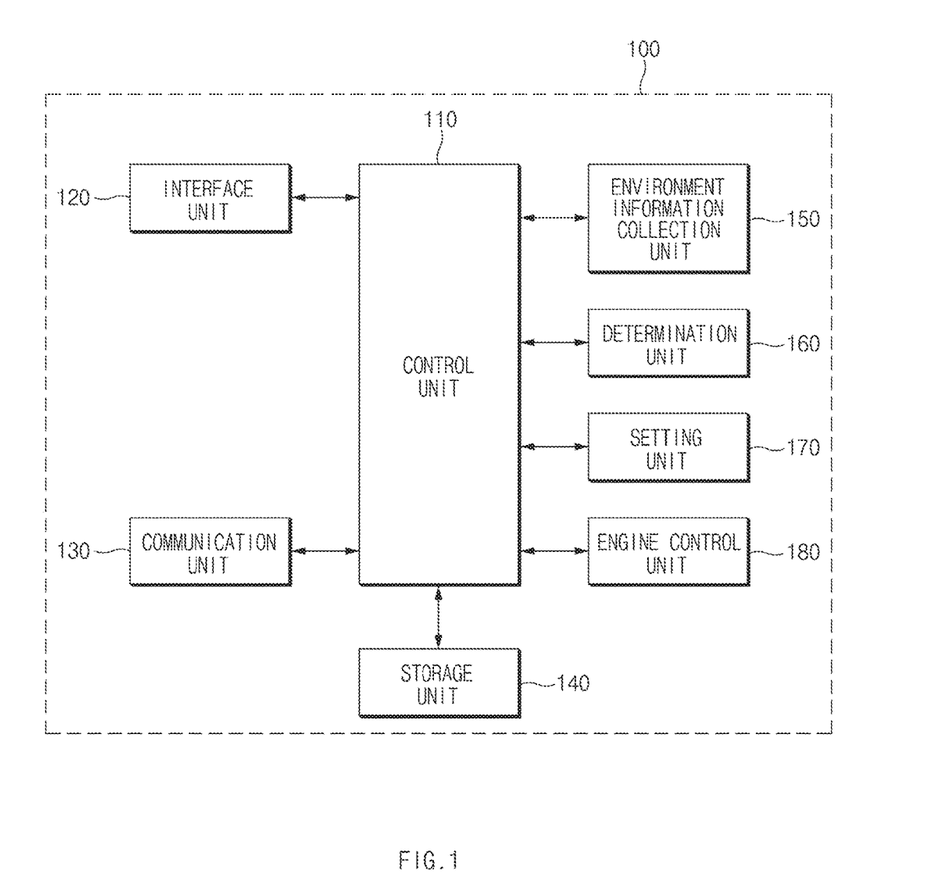
FIG. 1 is a block diagram illustrating a configuration of an apparatus for controlling an engine of a hybrid vehicle.

FIG. 1 is a block diagram illustrating one form of a configuration of an apparatus for controlling an engine of a hybrid vehicle.

An engine control device 100 of a hybrid vehicle in some forms of the present disclosure may be implemented inside a vehicle. In this case, an engine control device 100 of the hybrid vehicle may be integrally formed with internal control units of the hybrid vehicle. The engine control device 100 may be implemented as a separate device and connected to the control units of the hybrid vehicle through separate connecting means. The engine control device 100 of the hybrid vehicle may operate in conjunction with sensors, an engine, and a motor provided in the hybrid vehicle, and may operate in conjunction with a control unit that controls the operation of the engine or the motor.

Referring to FIG. 1, the engine control device 100 of the hybrid vehicle may include a control unit 110, an interface unit 120, a communication unit 130, a storage unit 140, an environment information collection unit 150, a determination unit 160, a setting unit 170, and an engine control unit 180. In this case, the control unit 110 may process signals transmitted between components of the engine control device 100 of the hybrid vehicle.

The interface unit 120 may include input means for receiving a control command from a driver and output means for outputting an operation state and result of the engine control device 100 of the hybrid vehicle.

Here, the input means may include a key button, and may include a mouse, a joystick, a jog shuttle, a stylus pen, and the like. In addition, the input means may include a soft key implemented on a display.

The output means may include the display and voice output means such as a speaker. When a touch sensor such as a touch film, a touch sheet, a touch pad, and the like is provided on the display, the display may operate as a touch screen, and may be implemented in an integrated form of the input means and the output means.

The display may include at least one of a liquid crystal display (LCD), a thin film transistor liquid crystal display (TFT LCD), an organic light-emitting diode (OLED), a flexible display, a field emission display (FED), and a three-dimensional display (3D display).

The communication unit 130 may include a communication module that supports a communication interface between electrical components, sensors, and/or control units provided in the hybrid vehicle. For example, the communication module may receive traveling environment information of the hybrid vehicle from sensors provided in the hybrid vehicle.

In this case, the communication module may include a module that supports vehicle network communication such as controller area network (CAN) communication, local interconnect network (LIN) communication, flex-ray communication, and the like.

In addition, the communication module may include a module for wireless Internet access or a module for short range communication.

The storage unit 140 may store data and/or algorithms required to operate the engine control device 100 of the hybrid vehicle.

The storage unit 140 may store the traveling environment information of the hybrid vehicle received through the communication unit 130 and may store set condition information for controlling the engine based on the traveling environment information of the hybrid vehicle. In addition, the storage unit 140 may store commands and/or algorithms for controlling the engine based on the traveling environment information of the hybrid vehicle.

Here, the storage unit 140 may include a storage medium such as a random access memory (RAM), a static random access memory (SRAM), a read-only memory (ROM), a programmable read-only memory (PROM), an electrically erasable programmable read-only memory (EEPROM), etc.

The environment information collecting unit 150 collects predetermined traveling environment information of the hybrid vehicle when the full auto temperature control (FATC) system is on-operated. The FATC system is a system that maintains a pleasant indoor space without regard to an external state by automatically adjusting an air flow direction, an air flow rate, a room temperature and an inflow state of an outside temperature.

Here, the environment information collecting unit 150 may collect the traveling environment information of the hybrid vehicle from the sensors connected through the communication unit 130. For example, the environment information collection unit 150 may collect engine state information of the hybrid vehicle, outside temperature information, traveling mode information, state-of-charge (SOC) information of a battery, coolant temperature information of the engine, the number of times of engine-on by heating air-conditioning control, and set temperature information, and the like.

The environment information collecting unit 150 stores the collected one or more travel environment information in the storage unit 140 and provides the collected information to the control unit 110, the setting unit 170, and/or the determination unit 160

The determination unit 160 compares the traveling environment information collected by the environment information collection unit 150 with preset reference information to determine whether an engine operation shutoff condition by the heating air-conditioning control of the FATC system is satisfied.

First, the determination unit 160 may determine whether the engine state is in an on-operation state by the heating air-conditioning control, based on the traveling environment information. The determination unit 160 may determine whether the engine operation shutoff condition by the heating air-conditioning control is satisfied before the engine is on-operated by the heating air-conditioning control.

Here, the determination unit 160 may determine whether the outside temperature, the traveling mode, the SOC of battery, and the coolant temperature meet the preset engine operation shutoff condition, based on the traveling environment information.

For example, the determination unit 160 may determine whether the outside temperature measured outside the hybrid vehicle is less than a preset reference outside temperature, based on the traveling environment information. In addition, the determination unit 160 may determine whether the current traveling mode of the hybrid vehicle is an urban mode based on the traveling environment information. In addition, the determination unit 160 may determine whether the SOC of the battery provided in the hybrid vehicle is less than a preset reference SOC based on the traveling environment information. Furthermore, the determination unit 160 may determine whether the coolant temperature of the hybrid vehicle is lower than a preset reference coolant temperature based on the traveling environment information.

The determination unit 160 may store the determination results in the storage unit 140 and transfer the determination results to the control unit 110, the setting unit 170, and/or the engine control unit 180.

The setting unit 170 sets reference information such as the reference coolant temperature required to determine whether to operate the engine in the heating air-conditioning control, by using the traveling environment information collected by the environment information collection unit 150.

The setting unit 170 sets the reference coolant temperature based on the outside temperature of the traveling environment information and a preset temperature for the heating air conditioning control in the travel environment information.

Meanwhile, when it is determined based on the determination result of the determination unit 160 that the outside temperature, the traveling mode, and the SOC of the battery meet the engine operation shutoff condition by the heating air-conditioning control, the setting unit 170 may change the preset reference coolant temperature.

Here, the setting unit 170 changes the preset reference coolant temperature based on the number of times of engine-on by the heating air-conditioning control. For example, the setting unit 170 may adjust the reference coolant temperature such that the reference coolant temperature increases when the number of times of engine-on by the heating air-conditioning control exceeds a preset reference value.

The setting unit 170 may provide the determination unit 160 with information about the changed reference coolant temperature. In this case, the determination unit 160 may determine whether the coolant temperature of the hybrid vehicle is less than the changed reference cooling water temperature, based on the information about the reference coolant temperature changed by the setting unit 170.

When it is confirmed that the traveling environment information meets all of the engine operation shutoff conditions by the heating air-conditioning control based on the determination result of the determination unit 160, the engine control unit 180 may prevent the engine from being turned on by the heating air-conditioning control of the FATC system.

Here, the engine control unit 180 may prevents the engine from being turned on by the heating air-conditioning control by preventing the hybrid vehicle from entering the creep traveling mode. Further, the engine control unit 180 may prevent the engine from being turned on by the heating air-conditioning control by adjusting the engine lock-up traveling time such that the engine lock-up traveling time increases.

Of course, after the engine control unit 180 prevents the engine from being turned on by the heating air-conditioning control, when the traveling environment information collected by the environment information collection unit 150 does not meet the engine operation shutoff condition by the heating air-conditioning control, the engine control unit 180 may cancel the engine-on shutoff.

Figure 2:
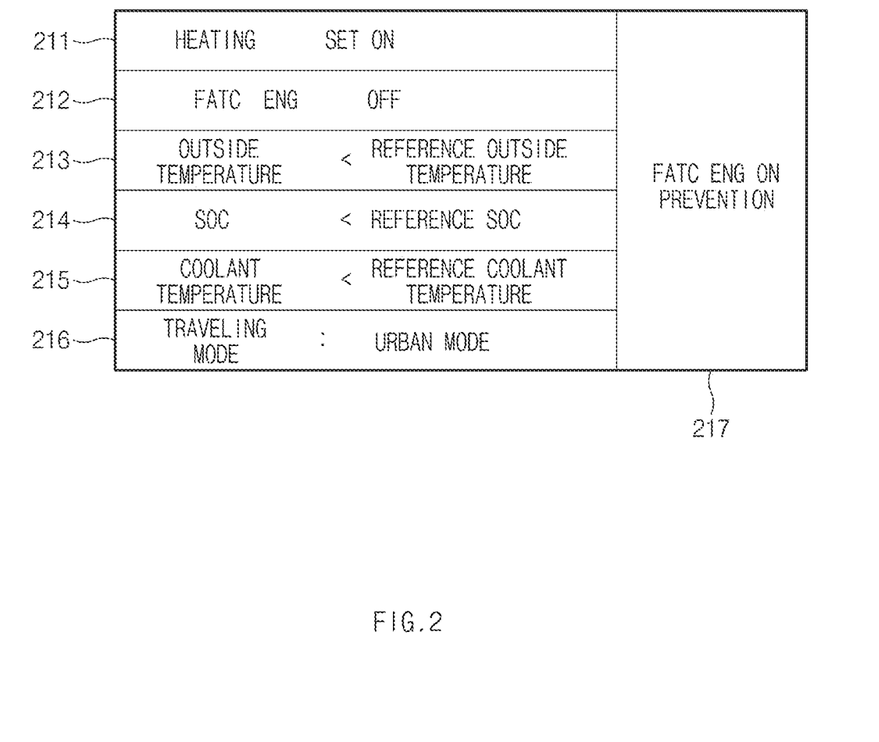
Figure 3A:
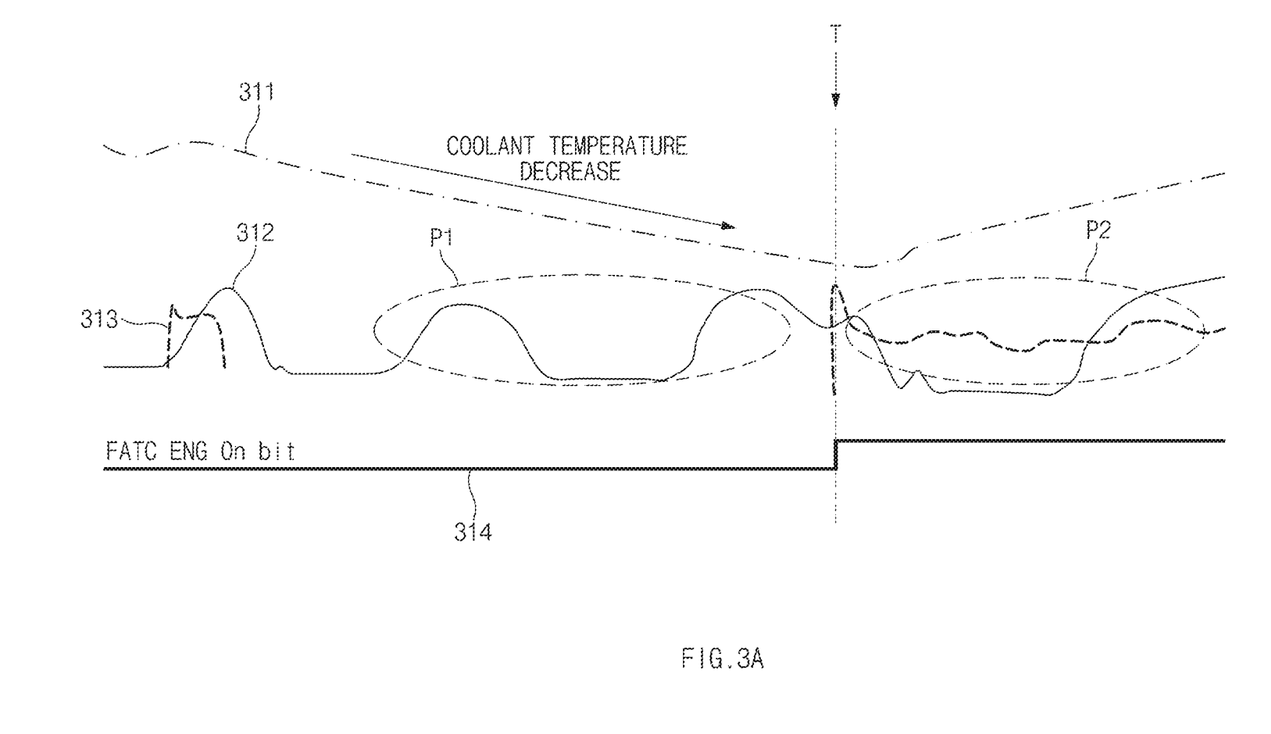
Figure 3B:
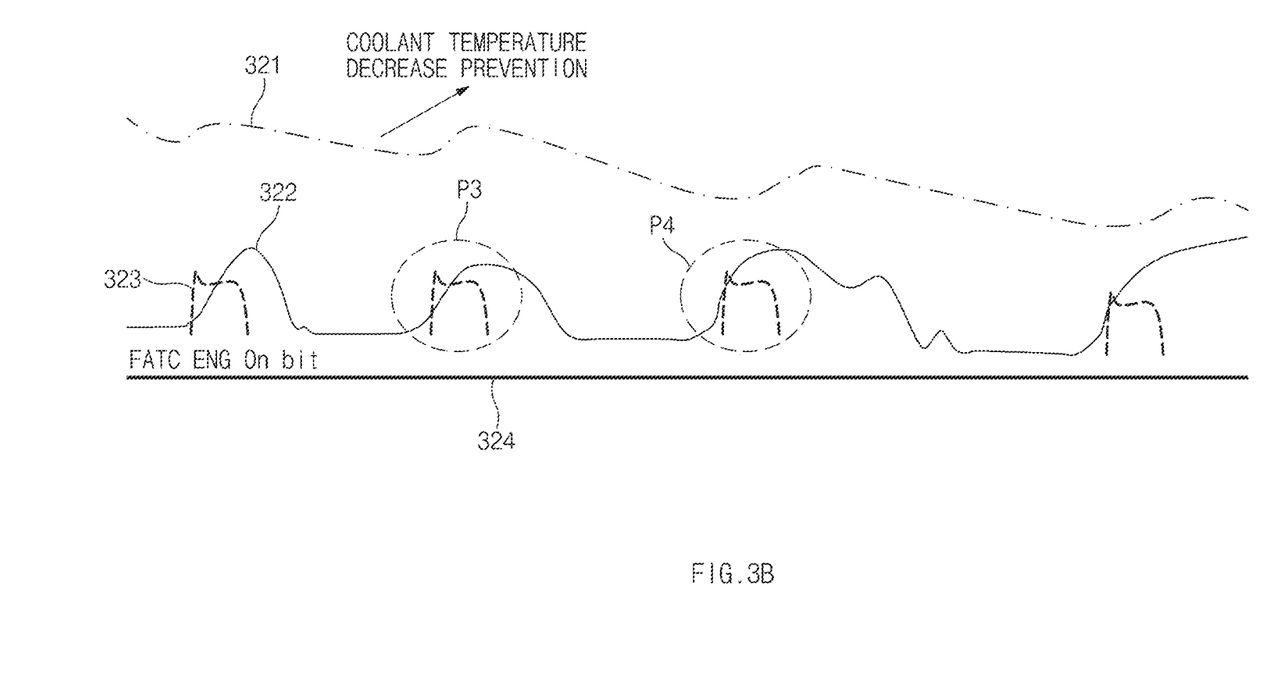

FIGS. 2 to 3B are views illustrating an operation of an apparatus for controlling an engine of a hybrid vehicle in some forms of the present disclosure.

FIG. 2 is a view illustrating certain conditions when the heating and air-conditioning control of the FATC system turns off the operation of an engine.

As shown in FIG. 2, these conditions (e.g., heating setting state, the current engine state controlled by the heating and air-conditioning control of the FATC system, the outside temperature, the SOC of the battery, the coolant temperature, the traveling mode, and so forth) are set based on certain factors capable of generating an engine-on command (i.e., command that the heating and air-conditioning control of the FATC system should turn on the operation of the engine).

Thus, when the engine operation shutoff condition, which includes the heating setting condition, the current engine condition by the heating air-conditioning control of the FATC system, the outside temperature, the SOC of the battery, the coolant temperature, the traveling mode, etc., meets all engine operation shutoff conditions denoted by reference numerals 211 to 216 of FIG. 2, the engine control device 100 of the hybrid vehicle prevents the engine from being turned on by the heating air-conditioning control of the FATC system.

Therefore, the engine control device 100 of the hybrid vehicle in some forms of the present disclosure may prevent the engine from being frequently turned on by the heating air-conditioning control.

FIGS. 3A and 3B illustrate one example in which the engine is prevented from being turned on by the heating air-conditioning control according to the operation of the engine control device of the hybrid vehicle in some forms of the present disclosure.

FIG. 3A illustrates an engine operation by heating air-conditioning control before applying the engine control device 100 of the hybrid vehicle in some forms of the present disclosure.

As shown in FIG. 3A, when a coolant temperature 311 continues to drop and a vehicle speed 312 is generated after the hybrid vehicle is stopped, the hybrid vehicle enters the creep traveling mode in which the hybrid vehicle slowly starts, so that the hybrid vehicle is EV-driven.

The FATC system controls the engine such that the engine is turned on by the heating air-conditioning control as in a second region P2 when the coolant temperature 311 continues to fall down to reaches a specific temperature T.

Thus, as indicated with reference numeral 314, the hybrid vehicle turns on the engine by the heating air-conditioning control of the FATC system.

Meanwhile, FIG. 3B illustrates the engine operation by the heating air-conditioning control by applying the engine control device 100 of the hybrid vehicle in some forms of the present disclosure.

As illustrated in FIG. 3B, when the engine-on state by the heating air-conditioning control of the FATC system is predicted, the engine control device 100 of the hybrid vehicle in some forms of the present disclosure changes the reference coolant temperature such that the coolant temperature 321 is prevented from falling below a predetermined temperature.

In addition, the engine control device 100 of the hybrid vehicle in some forms of the present disclosure prevents the hybrid vehicle from entering the creep traveling mode as in third and fourth regions P3 and P4.

Thus, as indicated with reference numeral 324, the hybrid vehicle may prevent the engine from being turned on by the heating air-conditioning control of the FATC system.

The operation of the apparatus configured as above in some forms of the present disclosure will be described in more detail as follows.

Figure 4:
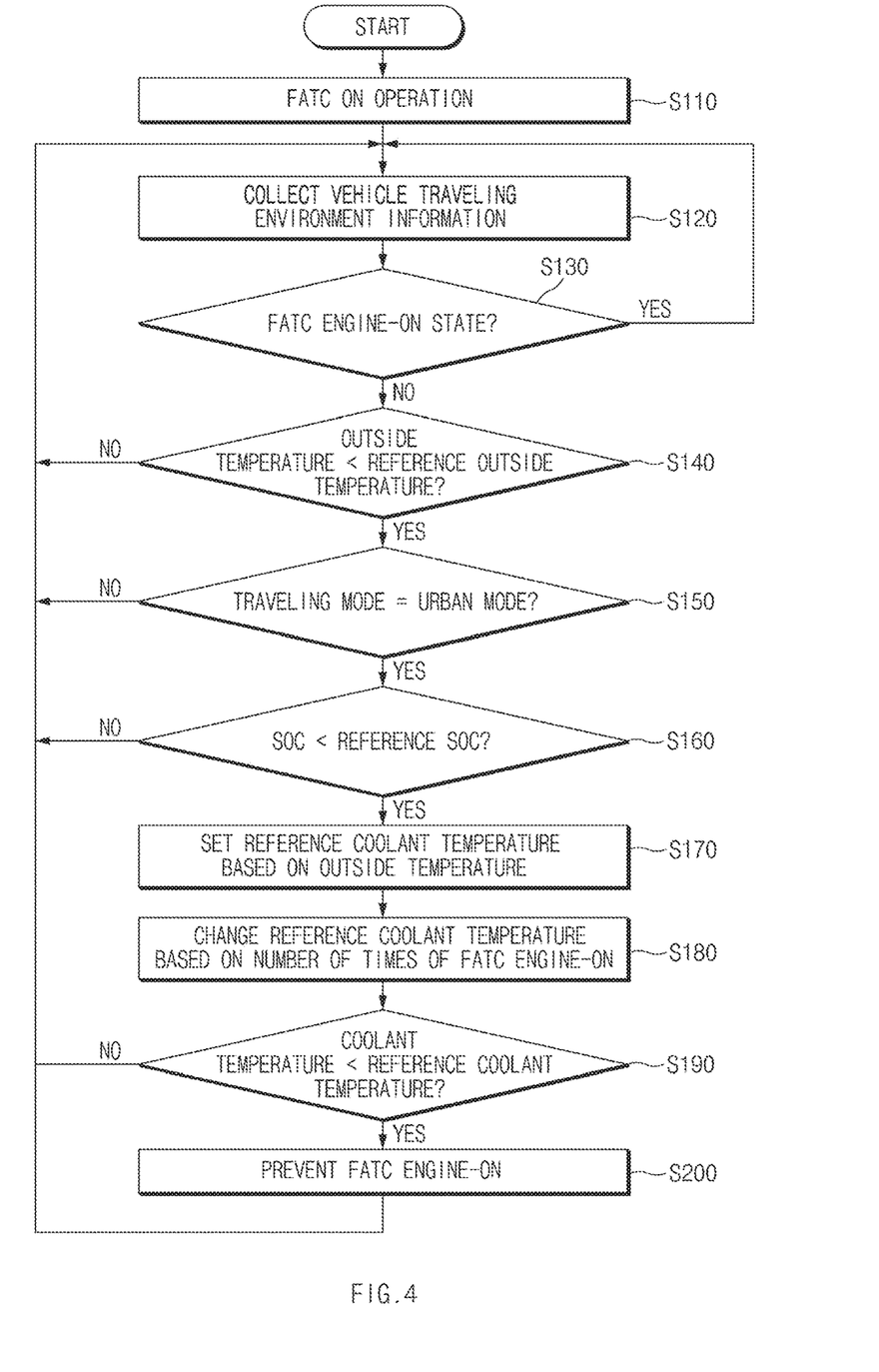
FIG. 4 is a flowchart illustrating a method of controlling an engine of a hybrid vehicle.

FIG. 4 is a flowchart illustrating a method of controlling an engine of a hybrid vehicle in some forms of the present disclosure.

As illustrated in FIG. 4, when the FATC system is on-operated in operation S110, the engine control device 100 of the hybrid vehicle collects the traveling environment information of the hybrid vehicle from the sensors provided in the hybrid vehicle in operation S120.

In this case, it is assumed that the FATC system is set in the heating air-conditioning control. The traveling environment information may include the engine state information of the hybrid vehicle, the outside temperature information, the traveling mode information, the SOC information of the battery, the coolant temperature information of the engine, the number of times of engine-on by the heating air-conditioning control, and the set temperature information, and the like.

In operation S130, the engine control device 100 of the hybrid vehicle determines whether the engine state is in the engine-on state by the heating air-conditioning control, based on the engine state information of the hybrid vehicle among the traveling environment information collected in operation S120.

When the engine is on-operated by the heating air-conditioning control in operation S130, the engine control device 100 of the hybrid vehicle may collect the traveling environment information through operation S120 while the hybrid vehicle is traveling.

Meanwhile, when the engine is not on-operated by the heating air-conditioning control in operation S130, the engine control device 100 of the hybrid vehicle may confirm the outside temperature, the traveling mode, the SOC of the battery, and the coolant temperature of the engine based on the traveling environment information, and may determine whether the outside temperature, the traveling mode, the SOC of the battery, and the coolant temperature of the engine meet the preset engine operation shutoff conditions.

If the outside temperature confirmed based on the traveling environment information is less than the reference outside temperature in operation S140, the traveling mode is the urban mode in operation S150, and the SOC of the battery is less than the reference SOC in operation S160, the engine control device 100 of the hybrid vehicle sets the reference coolant water temperature on the basis of the outside temperature confirmed based on the traveling environment information and the temperature preset for the heating air-conditioning control in operation S170.

In operation S180, the engine control device 100 of the hybrid vehicle may change the reference coolant temperature, which is set based on the outside temperature in operation S170, based on the number of times that the engine is turned on by the heating air-conditioning control.

In operation S180, the engine control device 100 of the hybrid vehicle may adjust the reference coolant temperature such that the reference coolant temperature increases when the number of times of engine-on by the heating air-conditioning control exceeds the preset reference value.

In operations S190 and S200, when the coolant temperature of the engine confirmed based on the traveling environment information is less than the reference coolant temperature set in operation S180, the engine control device 100 of the hybrid vehicle prevents the engine from being turned on by the FATC system.

As described above, the engine control device 100 of the hybrid vehicle in some forms of the present disclosure may be implemented as an independent hardware device, and may be driven in the form of at least one processor included in another hardware apparatus such as a microprocessor or a general purpose computer system.

Figure 5:
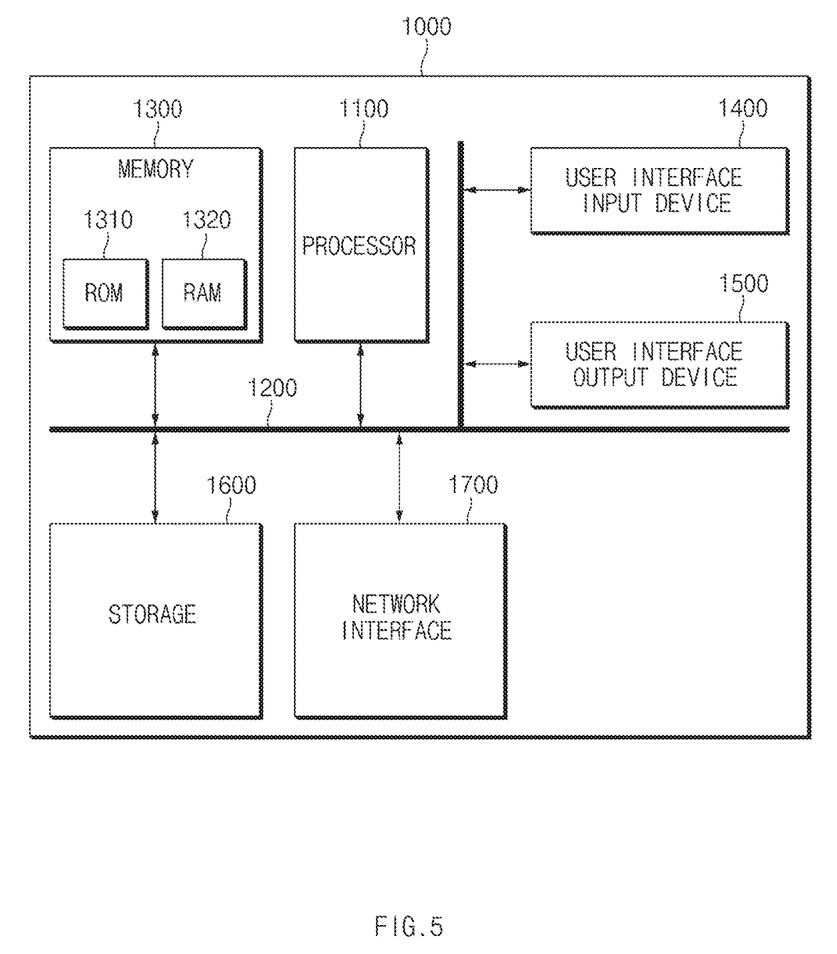
FIG. 5 is a block diagram illustrating a computer system executing a method of controlling an engine of a hybrid vehicle.

FIG. 5 is a block diagram illustrating a computer system executing a method of controlling an engine of a hybrid vehicle in some forms of the present disclosure.

Referring to FIG. 5, a computing system 1000 may include at least one processor 1100, a memory 1300, a user interface input device 1400, a user interface output device 1500, a storage 1600, and an interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in some forms of the present disclosure may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc. An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

In some forms of the present disclosure, the engine efficiency may be improved by restricting the on/off operation of the engine when the heating air-conditioning control is performed, and the amount of the non-driven fuel consumption may be minimized by restricting the on/off operation of the engine.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling an engine of a hybrid vehicle, the apparatus comprising:
   an environment information collection unit configured to collect traveling environment information of the hybrid vehicle;
   a determination unit configured to:
     compare the traveling environment information with reference information; and
     determine whether the traveling environment information meets a preset condition;
   a setting unit configured to:
     set a reference coolant temperature based on the traveling environment information; and
     when the traveling environment information meets the preset condition, change the reference coolant temperature based on the traveling environment information; and
   an engine control unit configured to, when the traveling environment information meets the preset condition and a coolant temperature is lower than the reference coolant temperature changed by the setting unit, prevent the engine from being turned on by heating and air conditioning (HAC) control of the hybrid vehicle.

2. The apparatus of claim 1, wherein the traveling environment information comprises information regarding at least one of engine state of the hybrid vehicle, outside temperature, traveling mode, state-of-charge (SOC) of a battery, coolant temperature of the engine, a number of times that the HAC control triggers an operation of an engine, or preset temperature.

3. The apparatus of claim 2, wherein the determination unit is configured to determine whether the HAC control triggers the operation of the engine of the hybrid vehicle based on the traveling environment information.

4. The apparatus of claim 3, wherein the determination unit is configured to, when it is determined that the HAC control does not trigger the operation of the engine of the hybrid vehicle, determine whether the outside temperature, the traveling mode and the SOC of the battery meet preset reference conditions based on the traveling environment information.

5. The apparatus of claim 4, wherein the setting unit is configured to, when it is determined that the outside temperature, the traveling mode and the SOC of the battery meet the preset reference conditions, change the reference coolant temperature based on the information regarding the number of times that the HAC control triggers the operation of the engine.

6. The apparatus of claim 5, wherein the setting unit is configured to, when it is determined that the outside temperature is lower than a preset reference outside temperature, the traveling mode is an urban mode, and the SOC of the battery is less than a reference SOC, change the reference coolant temperature.

7. The apparatus of claim 2, wherein the setting unit is configured to set the reference coolant temperature based on the outside temperature and the preset temperature.

8. The apparatus of claim 5, wherein the determination unit is configured to determine whether the coolant temperature is lower than the reference coolant temperature changed by the setting unit.

9. The apparatus of claim 1, wherein the engine control unit is configured to prevent the hybrid vehicle from operating in a creep traveling mode.

10. The apparatus of claim 1, wherein the engine control unit is configured to increase an engine lock-up traveling time.

11. The apparatus of claim 1, wherein the environment information collection unit is configured to, when a full auto temperature control system performs the HAC control, collect preset traveling environment information.

12. A method of controlling an engine of a hybrid vehicle, the method comprising:
collecting traveling environment information of the hybrid vehicle;
comparing the traveling environment information with reference information;
determining whether the traveling environment information meets a preset condition;
setting a reference coolant temperature based on the traveling environment information;
when the traveling environment information meets the preset condition, changing the reference coolant temperature based on the traveling environment information; and
when the traveling environment information meets the preset condition and a coolant temperature is lower than the reference coolant temperature changed based on the traveling environment information, preventing the engine from being turned on by heating and air-conditioning (HAC) control of the hybrid vehicle.

13. The method of claim 12, wherein the traveling environment information comprises information regarding at least one of engine state of the hybrid vehicle, outside temperature, traveling mode, state-of-charge (SOC) of a battery, coolant temperature of the engine, a number of times that the HAC control triggers an operation of an engine, or preset temperature.

14. The method of claim 13, wherein determining whether the traveling environment information meets the preset condition further comprises:
determining whether the HAC control triggers the operation of the engine of the hybrid vehicle based on the traveling environment information; and
when it is determined that the HAC control does not trigger the operation of the engine of the hybrid vehicle, determining whether the outside temperature, the traveling mode and the SOC of the battery meet preset reference conditions based on the traveling environment information.

15. The method of claim 14, wherein setting the reference coolant temperature comprises:
when it is determined that the outside temperature, the traveling mode and the SOC of the battery meet the preset reference conditions, changing the reference coolant temperature based on the information regarding the number of times that the HAC control triggers the operation of the engine.

16. The method of claim 15, further comprising:
determining whether the coolant temperature is lower than the reference coolant temperature changed based on the information regarding the number of times that the HAC control triggers the operation of the engine.

17. The method of claim 13, wherein setting the reference coolant temperature comprises:
setting the reference coolant temperature based on an outside temperature and the preset temperature.

18. The method of claim 12, wherein preventing the engine from operating comprises:
preventing the hybrid vehicle from entering a creep traveling mode.

19. The method of claim 12, wherein preventing the engine from operating comprises:
increasing an engine lock-up traveling time.

20. The method of claim 12, wherein collecting the traveling environment information comprises:
when a full auto temperature control system performs the HAC control, collecting preset traveling environment information.

* * * * *